(12) United States Patent
Mestre et al.

(10) Patent No.: US 7,604,460 B2
(45) Date of Patent: Oct. 20, 2009

(54) ROTORCRAFT ROTORS HAVING TWISTABLE BLADES

(75) Inventors: Gilbert Mestre, Salon de Provence (FR); Guy Cruveiller, Marignane (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/589,950

(22) Filed: Oct. 31, 2006

(65) Prior Publication Data

US 2007/0104580 A1   May 10, 2007

(30) Foreign Application Priority Data

Nov. 4, 2005   (FR)   ................... 05 11225

(51) Int. Cl.
*B64C 27/33*   (2006.01)
(52) U.S. Cl. ................... 416/134 A; 416/141; 416/203; 411/88; 411/92; 411/119; 411/120
(58) Field of Classification Search ............. 416/134 A, 416/136, 138, 141, 203, 244 R; 411/88–94, 411/119, 120
See application file for complete search history.

(56) References Cited

U.S. PATENT DOCUMENTS

| 175,427 | A | | 3/1876 | Cobb | |
|---|---|---|---|---|---|
| 492,722 | A | * | 2/1893 | Gibson | 411/89 |
| 595,775 | A | * | 12/1897 | Herrin | 411/94 |
| 625,122 | A | * | 5/1899 | Price | 411/94 |
| 630,117 | A | * | 8/1899 | Saur | 411/93 |
| 856,246 | A | * | 6/1907 | Gamon | 411/84 |
| 2,372,416 | A | | 3/1945 | Fairhurst | |
| 2,469,441 | A | | 5/1949 | Pitisci | |
| 4,626,172 | A | | 12/1986 | Mouile et al. | |
| 4,740,124 | A | * | 4/1988 | Pearson et al. | 411/88 |
| 5,286,167 | A | * | 2/1994 | Byrnes et al. | 416/134 A |
| 5,383,767 | A | * | 1/1995 | Aubry | 416/134 A |
| 5,542,818 | A | | 8/1996 | Monvallier et al. | |
| 2005/0201848 | A1 | | 9/2005 | Reilly | |

FOREIGN PATENT DOCUMENTS

FR   1 531 536   7/1968

* cited by examiner

*Primary Examiner*—Christopher Verdier
(74) *Attorney, Agent, or Firm*—Young & Thompson

(57) ABSTRACT

A rotorcraft rotor includes a hub, a first blade having a first twistable structure secured to the hub by a first bolt and a first ring or washer, a second blade having a second twistable structure secured to the hub by a second bolt and a second ring or washer. The rotor includes a stop structure for preventing each ring or washer from turning relative to the hub or relative to the corresponding twistable structure.

8 Claims, 2 Drawing Sheets

ROTORCRAFT ROTORS HAVING TWISTABLE BLADES

The present invention relates to an improvement to rotorcraft rotors having twistable blades.

FIELD OF THE INVENTION

The technical field of the invention is that of manufacturing helicopters.

The invention applies in particular to a helicopter rotor having a plurality of blades secured to the hub of the rotor, each blade having an internal portion (or root) sometimes referred to as a twistable bundle or arm that is elongate along the longitudinal axis of the blade and that presents great capacity for elastic deformation in twisting about said axis, thereby enabling the pitch of the blade to be adjusted in spite of said twistable root being rigidly secured to the hub.

BACKGROUND OF THE INVENTION

Such a rotor is described in particular in French patent FR 2 685 675 and U.S. Pat. No. 5,330,322.

The invention applies more particularly to a rotor of that type in which the twistable structure is secured to the hub by clamping the twistable structure between two parts of the hub, using a bolt associated with a washer or ring for transmitting a clamping force.

It has been found that under certain circumstances, during tightening of the nut and/or the bolt, the washer or ring can be caused to turn due to friction against the nut, and that this turning can lead to harmful deformation of the portion of the twistable structure through which the bolt extends, this deformation being more accentuated when the twistable structure is thin.

OBJECTS AND SUMMARY OF THE INVENTION

The invention seeks to solve that problem.

Another object of the invention is to provide such rotorcraft rotors that are improved and/or that remedy, at least in part, the shortcomings or drawbacks of known rotorcraft rotors.

The invention provides for fitting such a rotor with stop means to prevent the ring or washer from turning relative to the hub part or relative to the twistable structure.

Thus, in an aspect of the invention, a rotorcraft rotor is provided comprising a hub, a first blade having a first twistable structure secured to the hub by a first bolt and a first ring or washer, and a second blade having a second twistable structure secured to the hub by a second bolt and a second ring or washer; the rotor further comprising stop means for preventing each ring or washer from turning relative to the hub or relative to the corresponding twistable structure. The stop means may include shanks of the first and second bolts that form abutments preventing the washer from turning relative to the hub or relative to the corresponding twistable structure.

In preferred embodiments of the invention:
- the stop means comprise an abutment secured to the hub and forming part of the connection means serving to secure the second twistable structure of the second blade to the hub; in particular, said abutment is essentially constituted by the second bolt;
- the second washer fitted to the second bolt is rigidly secured to the first washer fitted to the first bolt;
- said first and second blades are adjacent;
- said first and second washers are formed by a thin plate pierced by two orifices that are spaced apart by a distance corresponding to the distance between the axes of the first and second bolts;
- each twistable structure is secured to the hub by a bolt, by a ring for transmitting clamping force to the twistable structure, and by a washer bearing against the ring, each twistable structure comprising a plurality of metal strips in a stack; and
- the rotor includes at least one third blade having a third twistable structure secured to the hub by a third bolt and a third ring or washer, the angles formed by each adjacent pair of blades being unequal.

BRIEF DESCRIPTION OF THE DRAWINGS

Other aspects, characteristics, and advantages of the invention appear from the following description which refers to the accompanying drawings that show preferred embodiments of the invention without any limiting character.

MORE DETAILED DESCRIPTION

Figure 1:
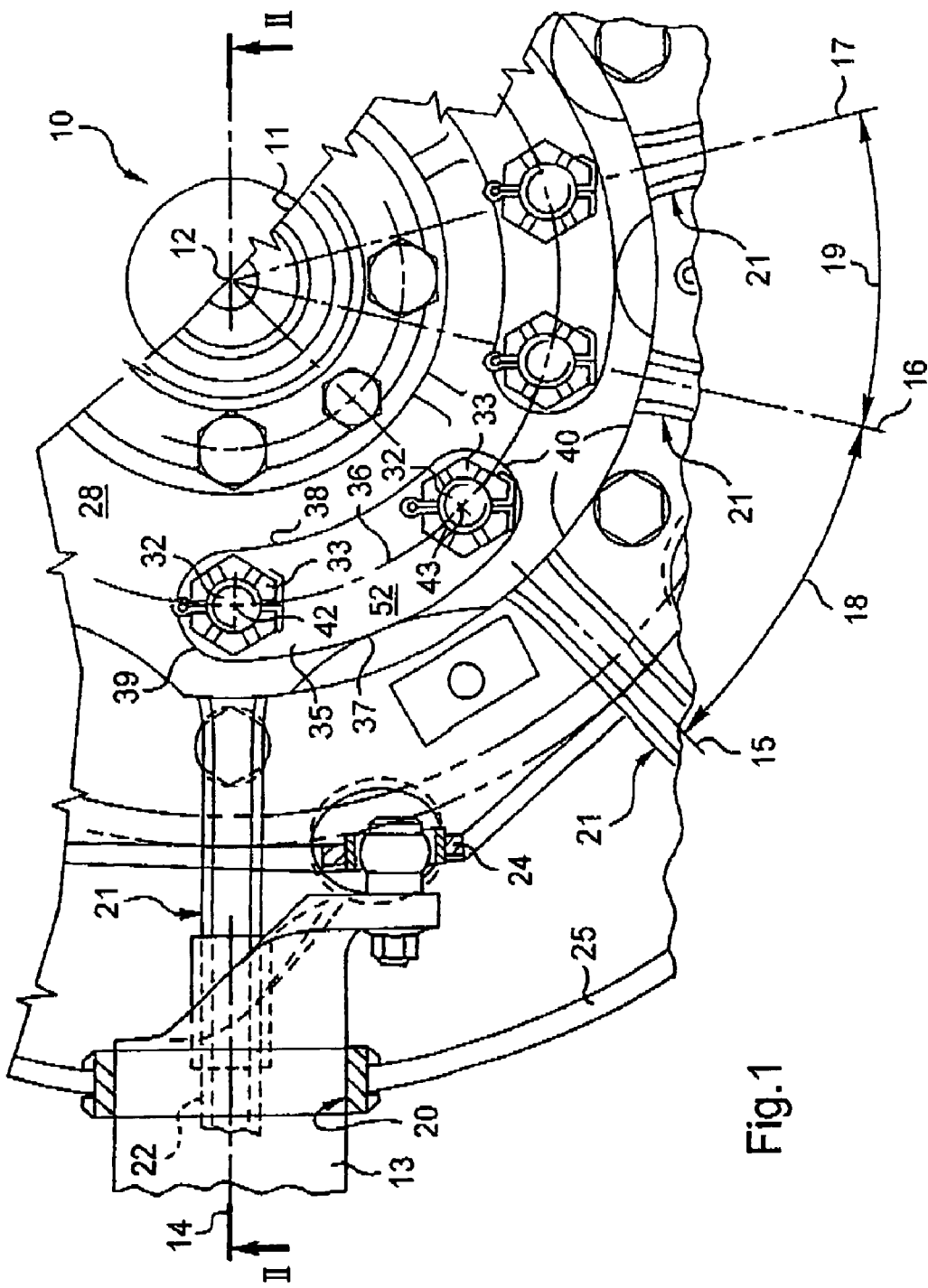
FIG. 1 is a cutaway face view of a helicopter antitorque rotor of the invention.
Figure 2:
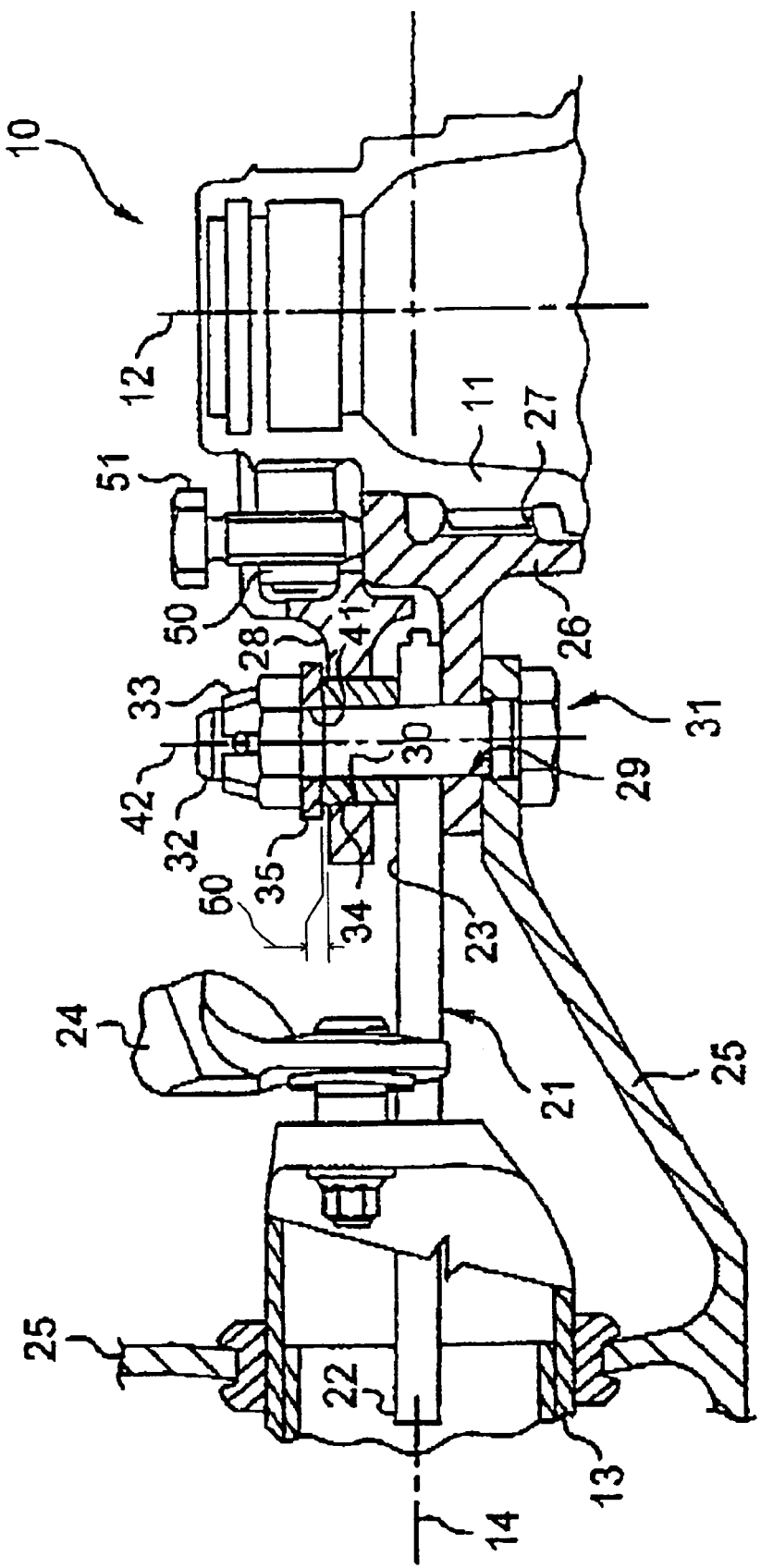
FIG. 2 is a fragmentary section on II-II of the rotor shown in FIG. 1.

The rotor 10 shown in FIGS. 1 and 2 comprises a shaft 11 extending along an axis 12 of rotation. The shaft is hollow and receives a control mechanism (not shown) for varying the pitch of the rotor blades.

The rotor has blades, such as the blade referenced 13, with respective longitudinal axes 14 to 17 extending radially relative to the axis 12 in a plane that is orthogonal to the axis 12.

The angles in this plane, such as angles 18 and 19 in FIG. 1, between the respective longitudinal axes of two consecutive blades have values that are not equal.

Each of the blades, and in particular the blades 13, is secured to the rotor hub by means of a bearing 20 that allows the blade to pivot about its longitudinal axis 14, thus allowing the pitch of the blade to be changed by a control rod 24, and by a twistable structure 21 having an outer portion 22 rigidly connected to the hub, as described below.

Each twistable structure comprises a plurality of metal strips stacked along an axis substantially parallel to the axis 12; each strip is elongate in shape along the longitudinal axis of the blade, and extends substantially in a plane perpendicular to the stacking axis.

The rotor hub has a main part 25 carrying the bearings 20, and secured to the shaft 11 by means of a flange 26 provided with fluting 27 for transmitting drive.

The hub also includes a second flange 28 facing the flange 26; each of these two flanges is pierced by orifices 29, 30 in an angular distribution around the axis 12 common to the flanges and to the shaft, which angular distribution is identical to that of the blades around said axis 12.

In order to secure the structure 21 to the hub, a fastener 31 is used that comprises a bolt 32 and a nut 33, the shank of the bolt extending through four orifices in alignment pierced respectively through the part 25, the flange 26, the inner end 23 of the structure 21, and the flange 28, as can be seen in FIG. 2 in particular.

An annular bushing (or ring) 34 and a washer 35 are engaged around the bolt; the washer 35 serves to transmit the clamping force of the fastener from the nut 33 to the bushing 34. The bushing 34 serves to transmit the clamping force from the washer 35 to the structure 21, 23 in order to rigidly secure the structure 21, 23 to the flange 26 of the hub. The nut 33 has sides and a planar bottom surface. The planar bottom surface is in direct contact with a second face of the washer 35 and is delimited by the sides.

The ring 34 is mounted to slide along the axis 42 of the bolt, in the orifice 30 pierced through the flange 28; this flange is secured to the flange 26 by bolts 51 and a nut 50 screwed on the end of the shaft 11.

The function of the ring 34 is to take up the mounting clearance between the flanges 26 and 28, but without inducing interfering forces in the flange 28. The ring 34 includes an upper end upon which the washer 35 is resting. The upper end extends upwardly from the orifice of the second flange in such a manner that an air gap 60 as seen in FIG. 2 is maintained between the washer and said second flange.

By preventing the washer 35 from turning, the washer 35 is prevented from turning the ring 34 about the axis 42 while the nut 33 is being tightened.

As shown in FIG. 1 in particular, the washer is formed by a thin plate or strip 52 that is elongate along a circular arc 36, having longitudinal edges extending along other circular arcs 37 and 38; these arcs 36 to 38 share a common center on the axis 12; the washer 35 presents two rounded end portions 39 and 40 presenting respective arcs interconnecting the arcs 37 and 38; the overall shape of the washer is roughly that of a kidney bean.

The washer 35 is pierced by two identical orifices 41 of respective axes 42 and 43 that are parallel to the axis 12 and that intersect the axes 14 and 15 respectively of two adjacent blades of the rotor.

In a variant that is not shown, the plate 52 acting as the multiple washer can be pierced by as many orifices 41 for passing screws 32 as there are blades on the rotor.

What is claimed is:

1. A rotorcraft rotor comprising:
   a hub,
   a first blade having a first twistable structure secured to the hub by a first bolt/nut combination and a first annular bushing, said first annular bushing being slidable on said first bolt,
   a second blade having a second twistable structure secured to the hub by a second bolt/nut combination and a second annular bushing, said second annular bushing being slidable on said second bolt, each twistable structure comprising a plurality of stacked metal strips, said first and second blades being adjacent, wherein:
   the first twistable structure is secured to the hub by the first bolt, by a washer serving to transmit clamping force to the first annular bushing, the washer bearing against the first annular bushing and being separate and distinct therefrom, and by the first annular bushing transmitting clamping force to the first twistable structure;
   the second twistable structure is secured to the hub by the second bolt, by said washer serving to transmit clamping force to the second annular bushing, the washer bearing against the second annular bushing and being separate and distinct therefrom, and by the second annular bushing transmitting clamping force to the second twistable structure; and
   said washer being formed by a thin plate which has a form of a circular arc and is pierced by two orifices spaced apart by a distance corresponding to the spacing between the axes of the first and second bolts;
   whereby the nuts of the first and second bolts form abutments preventing the washer from turning relative to the hub or relative to the corresponding twistable structure, each of said nuts having sides and a planar bottom surface, said planar bottom surface being in direct contact with said washer and being delimited by said sides.

2. A rotor according to claim 1, including at least one third blade having a third twistable structure secured to the hub by a third bolt and a third annular bushing or washer, and in which the angles formed by each adjacent pair of blades are unequal.

3. A rotor according to claim 1, in which each of the blades is secured to the hub of the rotor via a bearing allowing the blade to pivot about its own longitudinal axis, thus enabling the pitch of the blade to be modified, and by one of the twistable structures having an inner portion rigidly secured to the hub, said rotor further comprises:
   a shaft extending along an axis;
   a main hub part carrying the bearings and secured to the shaft via a first flange having fluting for transmitting drive; and
   a second flange extending in register with the first flange;
   each of the two flanges being pierced by orifices in an angular distribution about the axis common to the flanges and to the shaft, said angular distribution is identical to that of the blades about said axis, each of said first and second bolts having a respective shank extending through four aligned orifices formed respectively in the main hub part, in the first and second flanges, and in an inner end of the twistable structure, a respective one of said first and second annular bushings and a respective one of said first and second orifices of said washer being engaged about each corresponding bolt so that said respective one of said bushings is slidable inside said second flange.

4. A rotorcraft rotor, comprising:
   a hub;
   a first blade having a first twistable structure secured to the hub by a first bolt/nut combination and a first annular bushing, said first annular bushing being slidable on said first bolt;
   a second blade having a second twistable structure secured to the hub by a second bolt/nut combination and a second annular bushing, said second annular bushing being slidable on said second bolt, said first and second twistable structures each comprising a plurality of stacked metal strips, said first and second blades being immediately adjacent; and
   a washer transmitting a clamping force to the first annular bushing to secure said first twistable structure to the hub, a first face of the washer bearing against the first annular bushing, each of said nuts having sides and a planar bottom surface, said planar bottom surface being in direct contact with a second face of said washer and being delimited by said sides,
   said washer bearing against the second annular bushing so that the second annular bushing transmits a clamping force to the second twistable structure; and
   said washer being formed by a thin plate having a form of a circular arc and having two orifices spaced apart by a distance corresponding to the spacing between the axes of the first and second bolts.

5. The rotor according to claim 4, further comprising at least a third blade having a third twistable structure secured to the hub by a third bolt and a third annular bushing, wherein angles formed by each adjacent pair of blades are unequal.

6. The rotor according to claim 4, further comprising a bearing securing each of the blades to the hub of the rotor and allowing the blade to pivot about its own longitudinal axis to enable the pitch of the blade to be modified, said first and second twistable structures each having an inner portion rigidly secured to the hub.

7. The rotor according to claim 6, further comprising:
a shaft extending along an axis;
a main hub part carrying each said bearing and secured to the shaft by a first flange having fluting for transmitting drive; and
a second flange extending in register with the first flange;
each of the first and second flanges having orifices in an angular distribution about the axis common to the flanges and to the shaft, said angular distribution is identical to that of the blades about said axis, each of said first and second bolts having a respective shank extending through four aligned orifices formed respectively in the main hub part, in the first and second flanges, and in the inner end of the first and second twistable structures, wherein a respective annular bushing and corresponding washer are engaged about each said bolt so that said respective one of said bushings is slidable inside said second flange.

8. An antitorque rotorcraft rotor comprising:
a hub;
a plurality of blades and fastening means for rigidly securing each blade to the hub;
the hub comprising a first flange under each blade and a second flange above each blade, with an orifice in each flange, said orifices of said flanges being aligned with each other;
each blade forming a longitudinal axis, and comprising an internal twistable bundle which has capacity for elastic deformation in twisting about the longitudinal axis, for the adjustment of the pitch of the blade, said twistable bundle comprising an inner end mounted between the first and second flanges, said inner end comprising another orifice which is aligned with the orifices of the hub;
said fastening means comprises for each blade a fastener bolt with a shank screwed into a nut, said fastener bolt and nut forming a screwing axis, the shank of the bolt extending through the orifices of the flanges and being in alignment respectively through the inner end and the hub, in such a manner to transmit a clamping force from the nut to said inner end;
the rotor further comprising anti friction means comprising an annular bushing and a washer, said washer being formed by a thin plate which has a form of a circular arc and is pierced by two orifices spaced apart by a distance corresponding to the spacing between the screwing axis of a respective fastener bolt, said annular bushing and said washer are both engaged around the fastener bolt and are distinct one from another, said annular bushing is engaged around the shank of the fastener bolt and is mounted to slide into the orifice of the second flange of the hub, with a lower end of the annular bushing forced against the inner end of the twistable bundle to transmit the clamping force from the washer to said inner end, the annular bushing also comprising an upper end upon which a first face of the washer is resting, said upper end of the annular bushing extends upwardly from the orifice of the second flange in such a manner that an air gap is maintained between the washer and said second flange, and said nut having sides and a planar bottom surface, said planar bottom surface being in direct contact with a second face of said washer and being delimited by said sides.

* * * * *